May 9, 1950          J. MUELLER          2,507,117

ZERO CONTROL MEANS IN ACCOUNTING MACHINES

Original Filed Feb. 1, 1940          8 Sheets-Sheet 1

INVENTOR
JOHN MUELLER

BY *John L. Sterling*

ATTORNEY

May 9, 1950 J. MUELLER 2,507,117
ZERO CONTROL MEANS IN ACCOUNTING MACHINES
Original Filed Feb. 1, 1940 8 Sheets-Sheet 3

INVENTOR
JOHN MUELLER
BY John L. Sterling
ATTORNEY

May 9, 1950

J. MUELLER 2,507,117

ZERO CONTROL MEANS IN ACCOUNTING MACHINES

Original Filed Feb. 1, 1940

INVENTOR
JOHN MUELLER

BY *John L. Sterling*

ATTORNEY

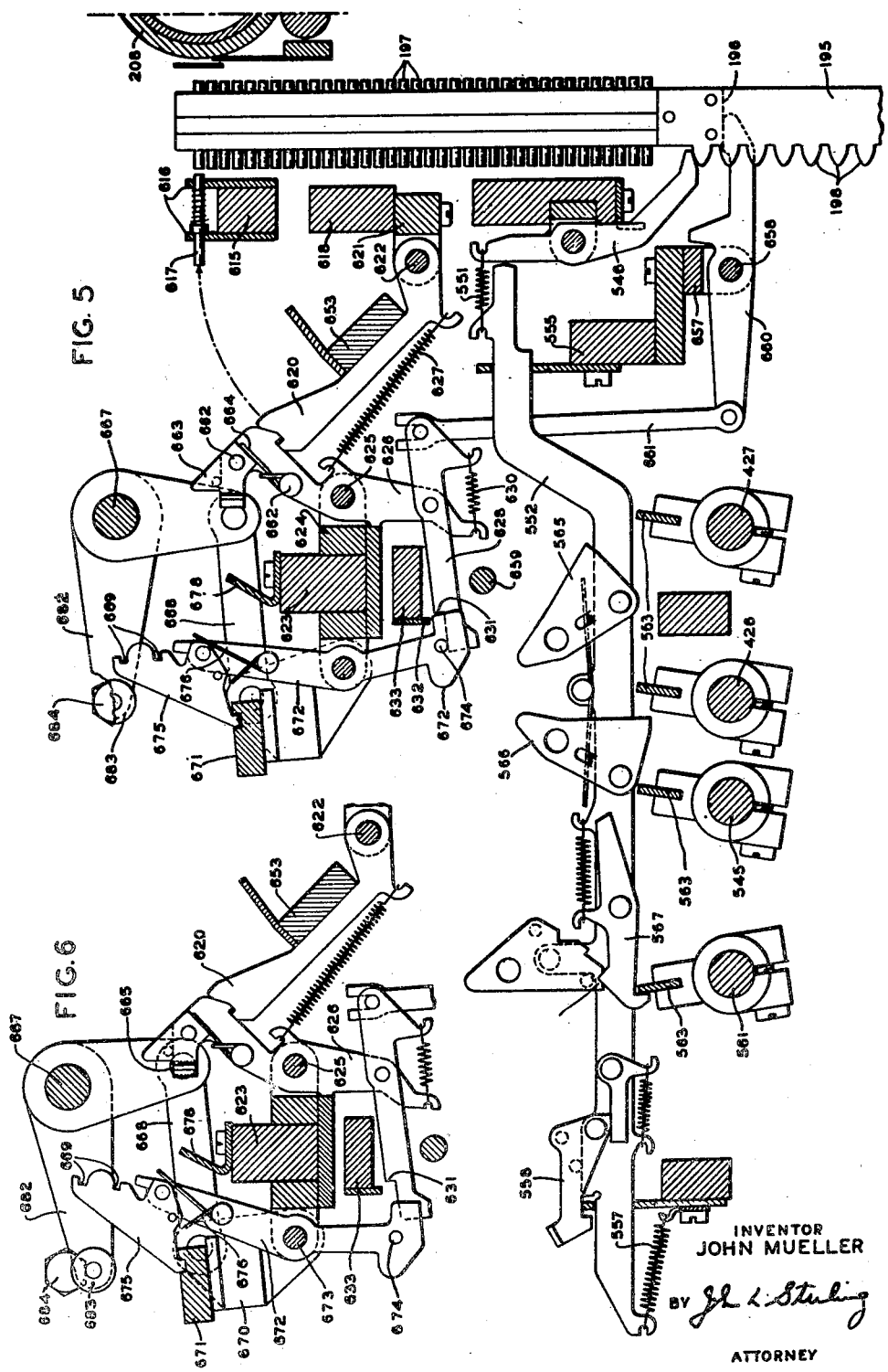

May 9, 1950   J. MUELLER   2,507,117
ZERO CONTROL MEANS IN ACCOUNTING MACHINES
Original Filed Feb. 1, 1940   8 Sheets-Sheet 6
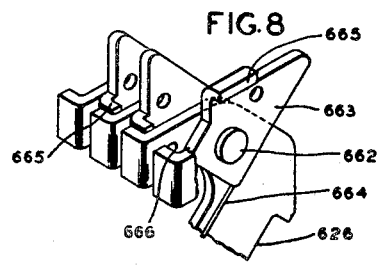
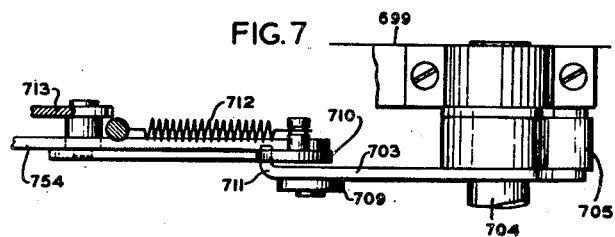
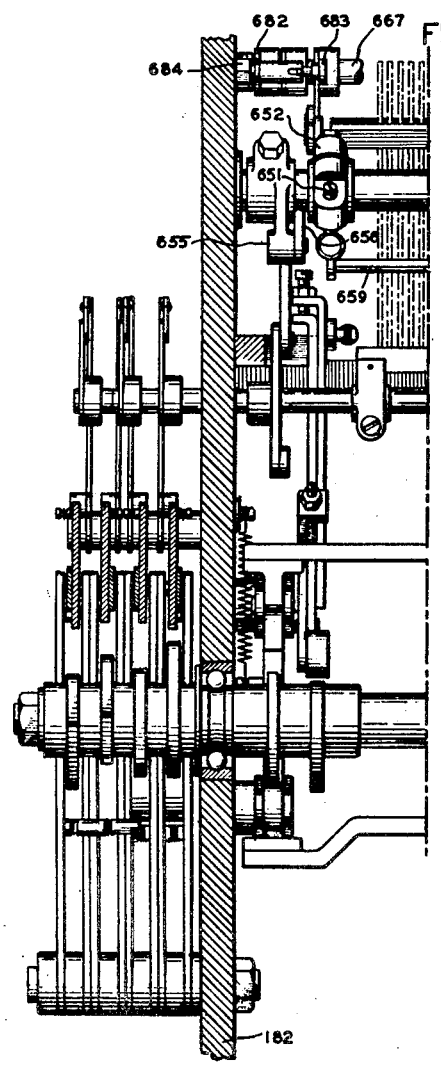
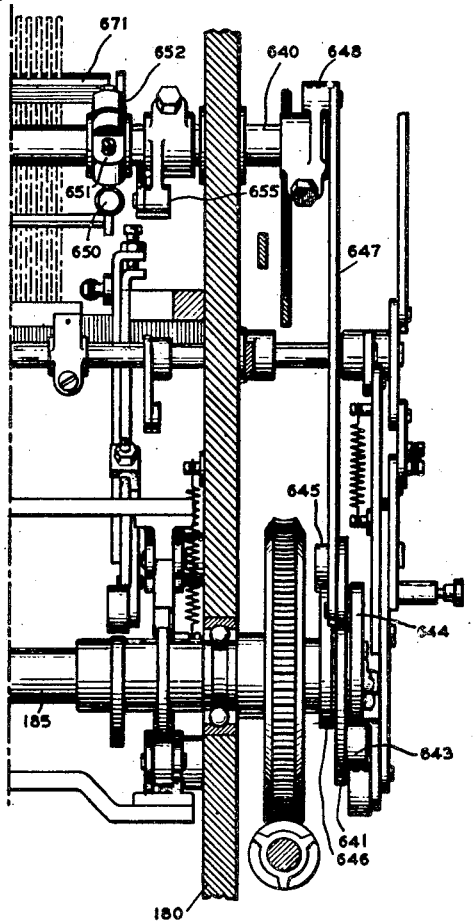
INVENTOR
JOHN MUELLER
BY *J. L. Sterling*
ATTORNEY May 9, 1950  J. MUELLER  2,507,117
ZERO CONTROL MEANS IN ACCOUNTING MACHINES
Original Filed Feb. 1, 1940  8 Sheets-Sheet 7
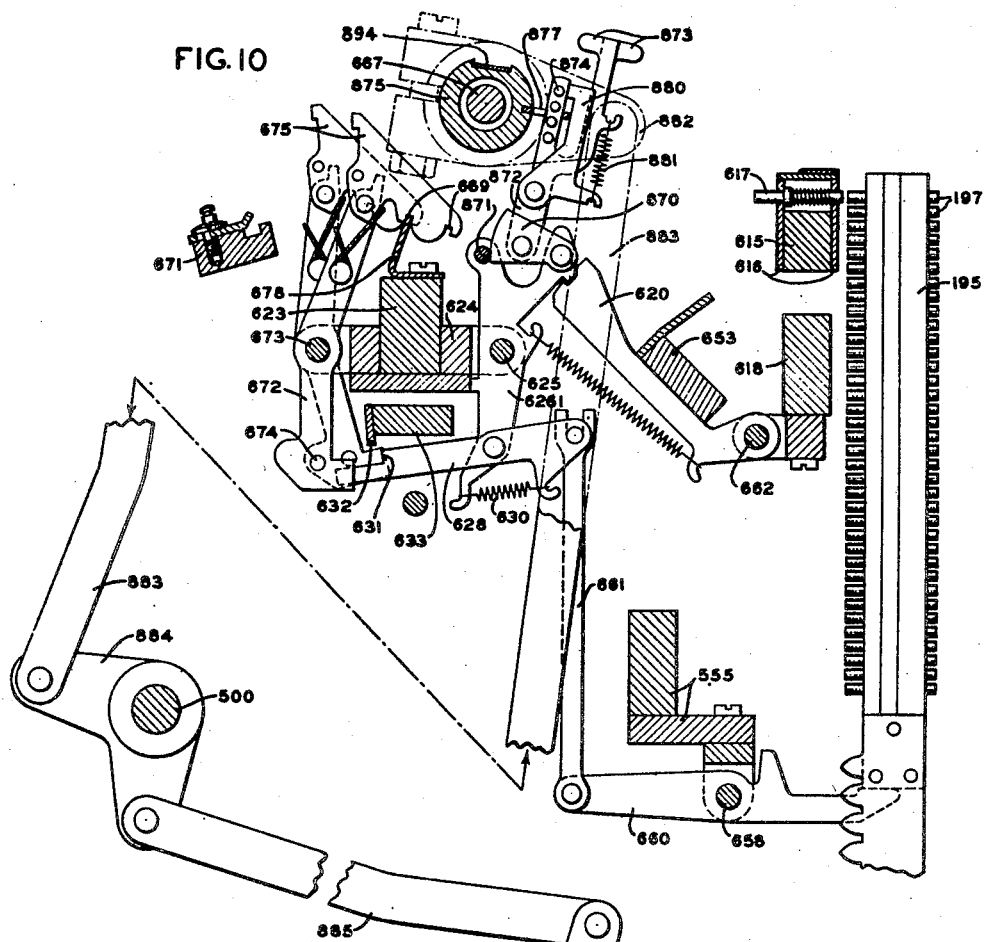
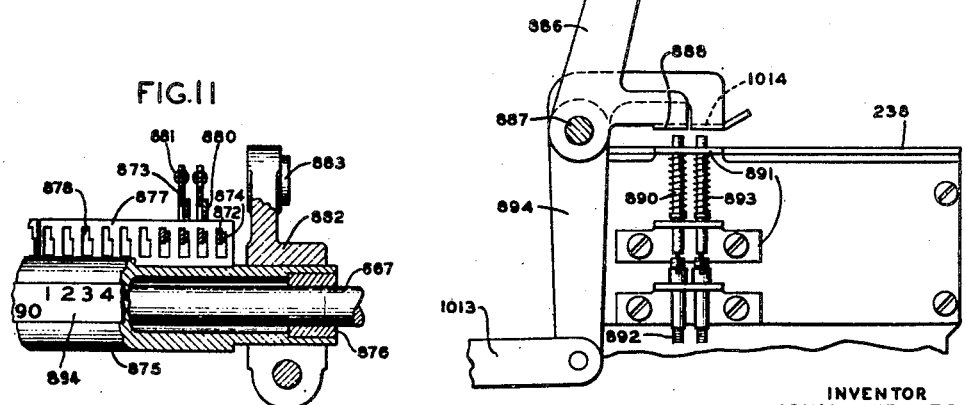
INVENTOR
JOHN MUELLER
BY *J. L. Sterling*
ATTORNEY May 9, 1950  J. MUELLER  2,507,117
ZERO CONTROL MEANS IN ACCOUNTING MACHINES
Original Filed Feb. 1, 1940  8 Sheets-Sheet 8
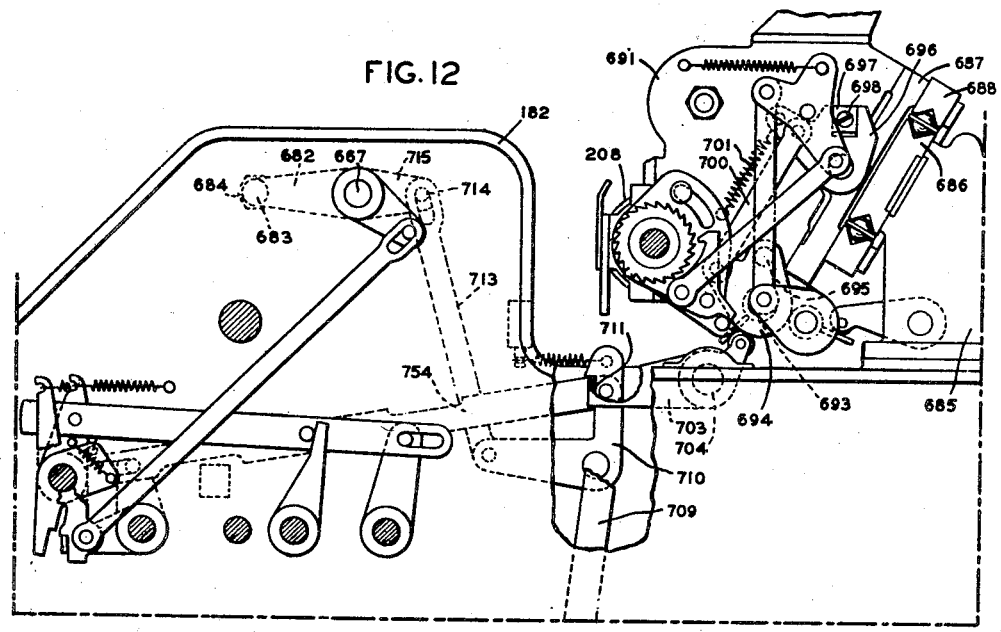
FIG. 12
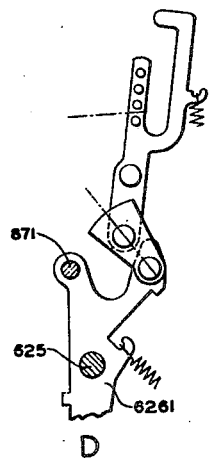
D
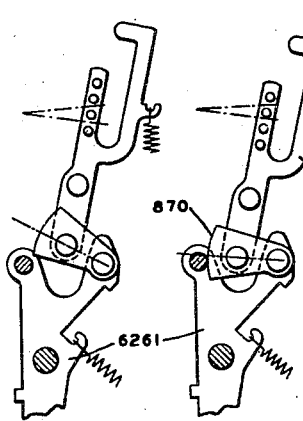
C  B
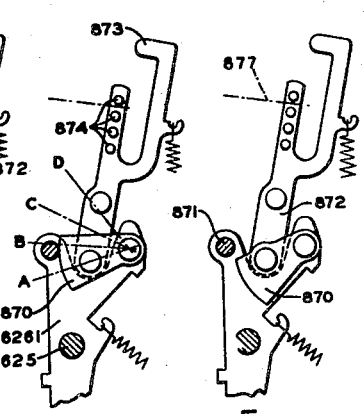
A  E
FIG. 13  FIG. 14  FIG. 15  FIG. 16  FIG. 17
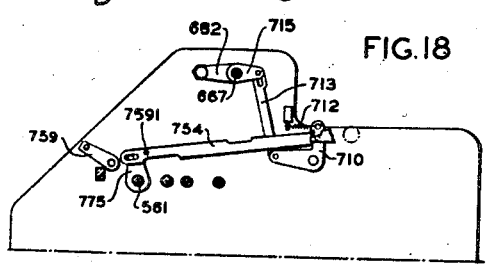
FIG. 18
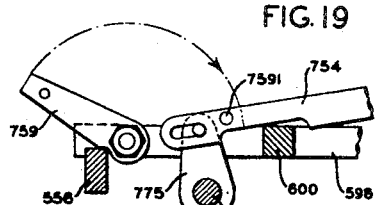
FIG. 19
INVENTOR
JOHN MUELLER
BY John L. Sterling
ATTORNEY Patented May 9, 1950

2,507,117

UNITED STATES PATENT OFFICE

2,507,117

ZERO CONTROL MEANS IN ACCOUNTING MACHINES

John Mueller, North Bergen, N. J., assignor to Remington Rand Inc., Buffalo, N. Y., a corporation of Delaware Original application February 1, 1940, Serial No. 316,739. Divided and this application January 26, 1944, Serial No. 519,733

7 Claims. (Cl. 101—93)

This is a division of my prior application for Letters Patent for Tabulating and accounting machines, filed February 1, 1940, Serial No. 316,739 now Patent No. 2,381,361, issued August 7, 1945.

The invention relates to accounting machines, and particularly to the means for effecting and controlling printing in and by such machines. Some of the features of the invention are adapted for use in printing accounting machines generally, and some of them are more especially designed for use in record controlled tabulating and like machines.

Machines of the class under consideration are known in which means are provided to cause some of the type hammers to be "fired" at certain cycles and others not, and said means has been pre-settable to afford different modes of operation; and means have been provided to change the set-up automatically, so that certain type hammers will operate in one cycle and not in another. The invention has for one of its objects to improve the means of the character indicated, and to extend its capabilities, so that the hammer controlling mechanism may be pre-set to afford a variety of modes of operation and to give a variety of results.

Machines of the class under consideration have commonly been provided with "zero connectors" or "couplers" to cause the printing of significant zeros; and these connectors have been made settable to active and to inactive positions, so as to print such zeros or not, as desired. This mechanism has been improved by the present invention, according to which the set-up of said connectors may be changed en bloc. A series of such connectors is provided pre-settable so as to provide for zero printing in one part of a line of printing and not in another; and means are provided to change such set-up to a different one, which different set-up is itself predetermined by the manual setting of the parts. Thus the type carriers may be furnished with both numeral and alphabetic types, and the connectors may be pre-set for printing numbers in certain columns and alphabetic text in other columns, and the connectors, or some of them, may be coupled to a shiftable member, which when shifted will disable the actively set connectors so that text may be printed across the whole line without zero printing; and, if desired, some of the connectors may be so coupled to said shiftable member so that they will remain active or inactive even when said member is shifted or that they may become active when said member is shifted. Said shiftable member may be operated automatically from some part of the machine so as to use one set-up normally but to shift to another set-up on certain machine cycles.

Other objects of the invention will be apparent from the following description:

One specific instance of the invention is illustrated in the accompanying drawings, in which Fig. 1 is a general vertical section of a tabulating machine having the invention embodied therein;

Fig. 5 is a front to rear sectional view of the upper part of the head section of the machine showing the type hammer and slam bail mechanism;

Fig. 6 is a view similar to a portion of Fig. 5, but showing the hammer mechanism set for non-list;

Fig. 7 is a fragmentary plan view of a detail;

Fig. 8 is a detail isometric view of the zero couplers;

Fig. 9 is a transverse sectional view on the line 9—9 of Fig. 2 and looking toward the rear;

Fig. 10 is a fragmentary front to rear sectional view showing the automatic card controlled zero coupler mechanism;

Fig. 11 is a fragmentary detail plan view of the upper part of Fig. 10, partly in section;

Fig. 12 is a view on a larger scale of a portion of Fig. 2, and also showing some of the carriage and line space mechanism;

Figs. 13, 14, 15, and 16 are fragmentary views illustrating a zero coupler in different adjustments;

Fig. 17 is a similar view of another zero coupler;

Fig. 18 is a small diagrammatic view showing a train of linkage; and

Figure 4:
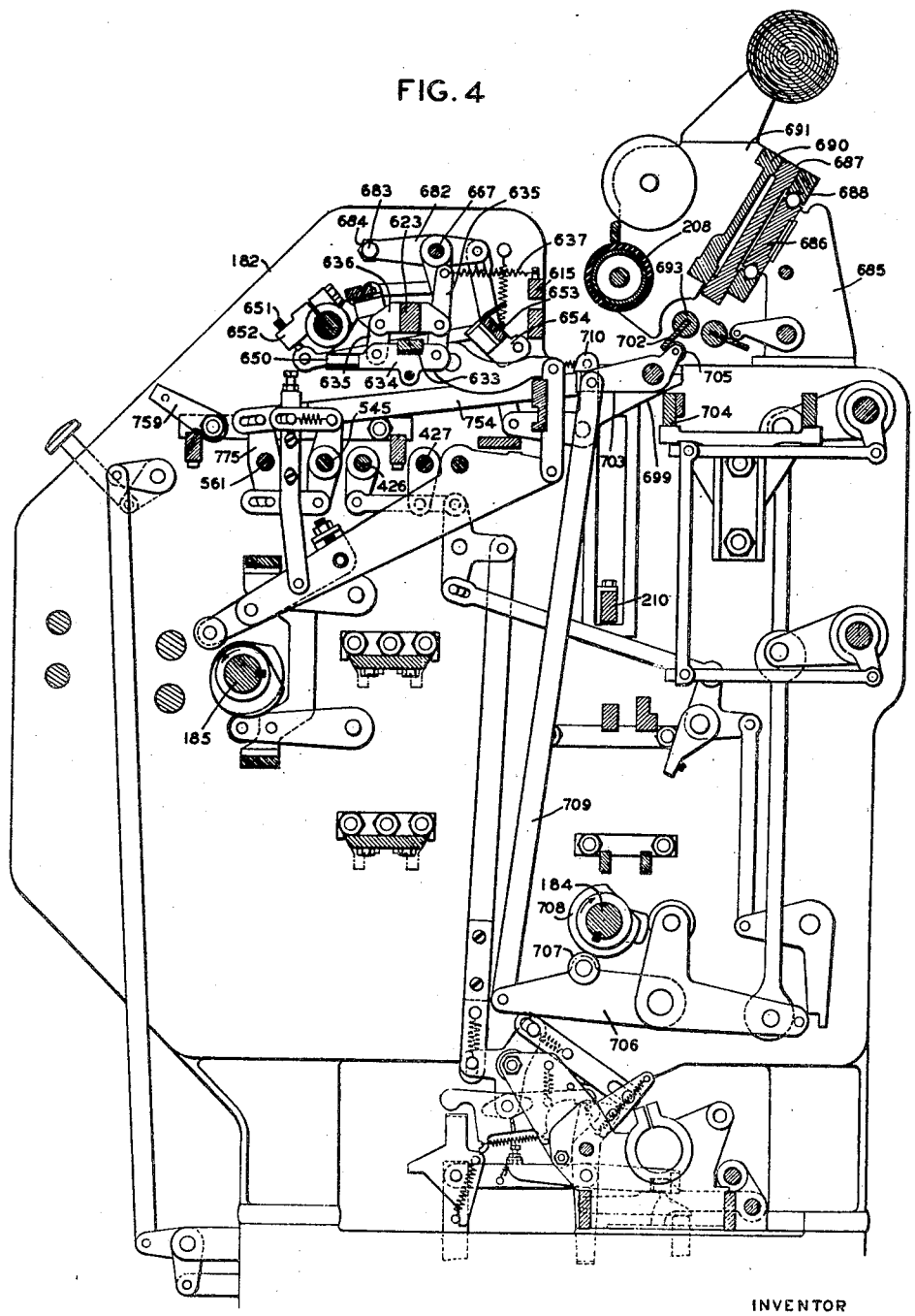
Fig. 4 is an elevation as viewed from the right and showing the mechanism inside the left-hand frame plate, cross bars and shafts being shown in section.

Fig. 19 is a fragmentary right-hand elevation, partly in section, of a portion of Fig. 4.

Figure 1:
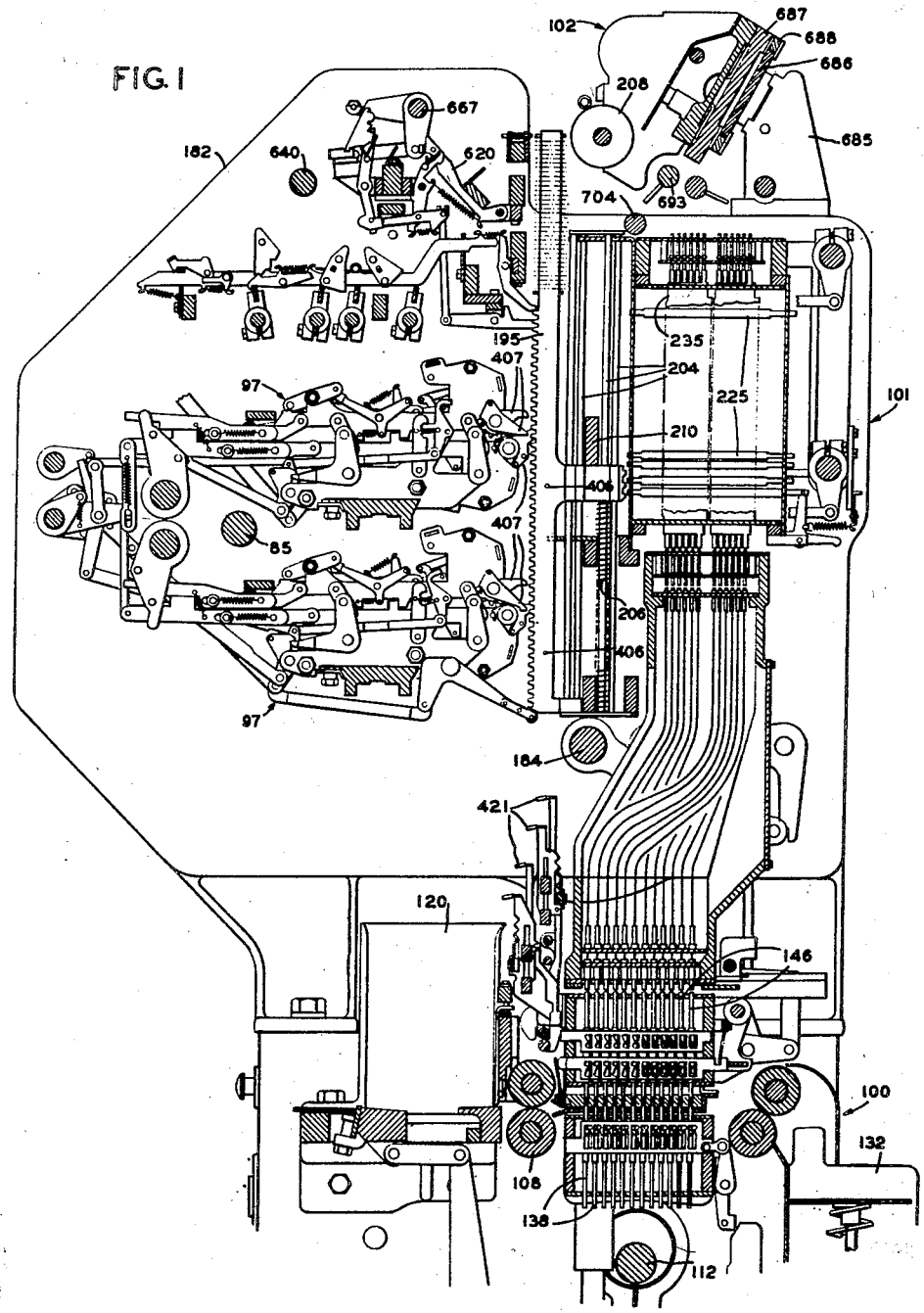

The invention may be applied to various machines. The one shown in the drawings is fully described in the parent application, Serial No. 316,739. In much of its general organization and in many of its parts, it is the same as the machine described in the patent to Lasker and Mueller, No. 2,323,816, issued July 6, 1943. It is a Powers punched card tabulating machine and comprises a base section 100 and a head section 101 (Fig. 1), the latter mounted on the former. The base section is substantially as described in the patent to Lasker, No. 2,044,119, dated June 16, 1936. Record cards are fed from a hopper 120 to a receptacle 132, by way of a sensing chamber where such sensing pins 138 as find holes lift set pins 146, which, in turn, actuate Bowden wires 240 in a translator 238. In the head section said Bowden wires set code bars 235 which control the stops 225 for the type carriers 195. A change of designation mechanism 421 may initiate operation of a total taking control unit 451 (Figs. 1, 2, and 3) which unit causes totals to be printed from totalizers 97 which are actuated by rack teeth on type carriers 195. This total taking control mechanism is fully described in Patent No. 2,323,816. The machine comprises three motor driven drive shafts, all geared to make one rotation at each cycle of the machine, viz., a main base shaft 112, a forward head shaft 185, and a rear head shaft 184.

Figure 2:
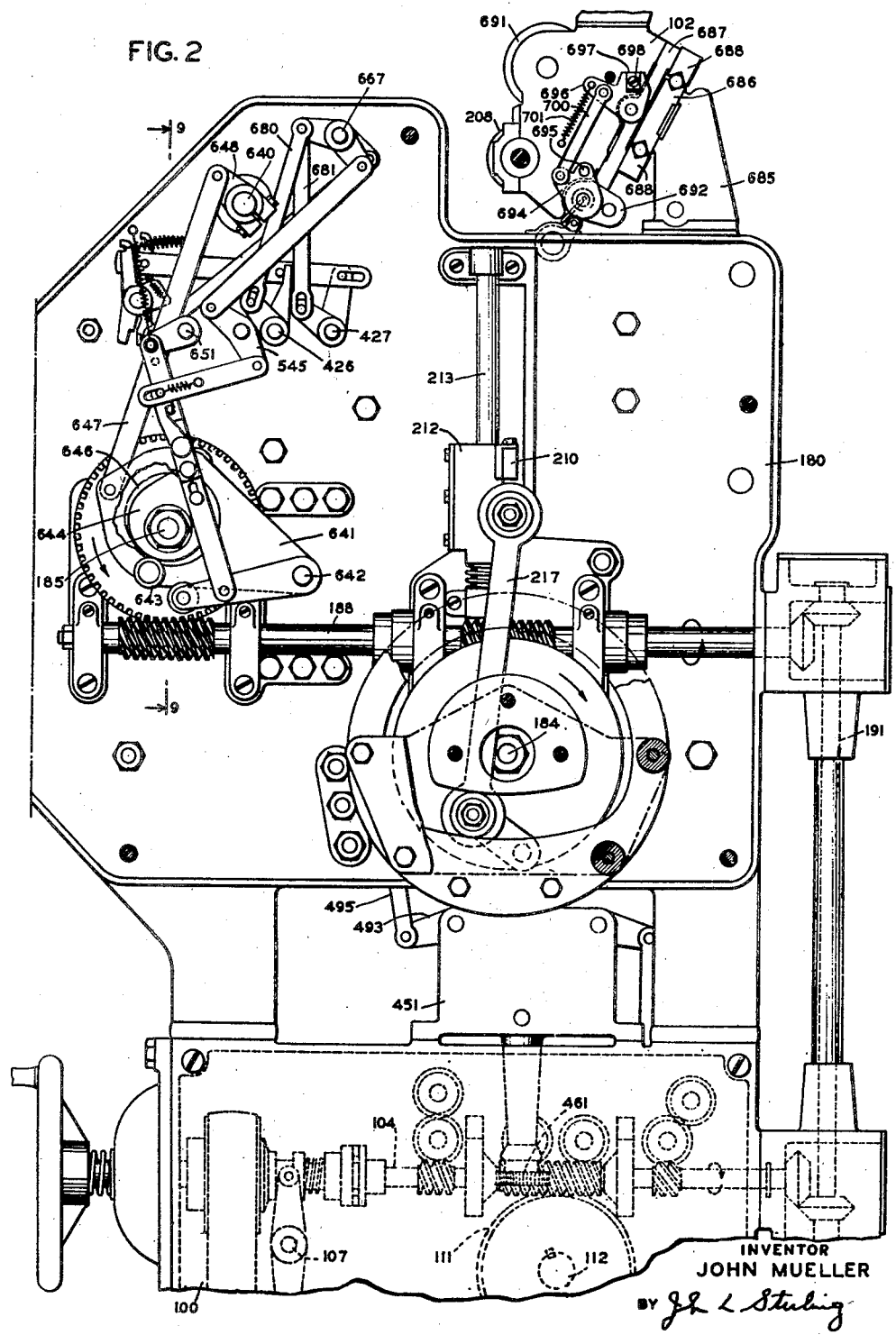
Fig. 2 is a right-hand end elevation.

The type carriers 195 slide up and down on vertical guide rods 204, being pushed up by compression springs 206 and pulled down to normal position by a restoring bar 210. The latter (Fig. 2 is secured at its ends to blocks 212 guided on rods 213 and reciprocated by pitmans 217 which are actuated by peculiarly arranged cranks on the ends of the rear drive shaft 184. Each type carrier has on it thirty-six types, viz., the ten numerals and the twenty-six letters of the alphabet, arranged as shown in Fig. 12. In the illustrated machine there are one hundred type carriers in an uninterrupted series, and one or two totalizers 97 may be set to be actuated by any desired succession of them. In other words, the construction is such that a line of one hundred letter spaces may be printed, comprising either numbers or alphabetic text or both, and one or more adding columns may be located at selected positions across the page. The totalizers can be disabled when desired, leaving the adding columns free to be used for alphabetic printing. This machine is, therefore, well adapted to illustrate an application of the present invention.

*Printing hammer mechanism*

The printing hammer section per se of the machine, that is to say, the devices immediately associated with the hammers and controlling their operation, has been changed entirely from the construction shown in the Lasker and Mueller patent. In front of the platen 208 is a stationary cross bar 615 (Fig. 5) having its ends secured detachably to the main frame members 180 and 182 of the head section 101. Two plates 616 carried by this bar have mounted therein spring restored firing pins 617, each in direct alignment with that one of the types 197 which is at printing position at the time.

A second cross bar 618 just below the bar 615, is also detachably secured to the main frame members and it has the type hammers 620 pivoted thereto. Preferably these hammers are pivoted in a succession of pivot blocks 621 which may conveniently be of a length to support ten hammers each, each block being slotted and having a pivot rod 622 inserted therein, as shown in Fig. 5. A succession of these blocks are secured to the underside of the bar 618, and extending across the machine so as to furnish a full complement of type hammers.

Figure 3:
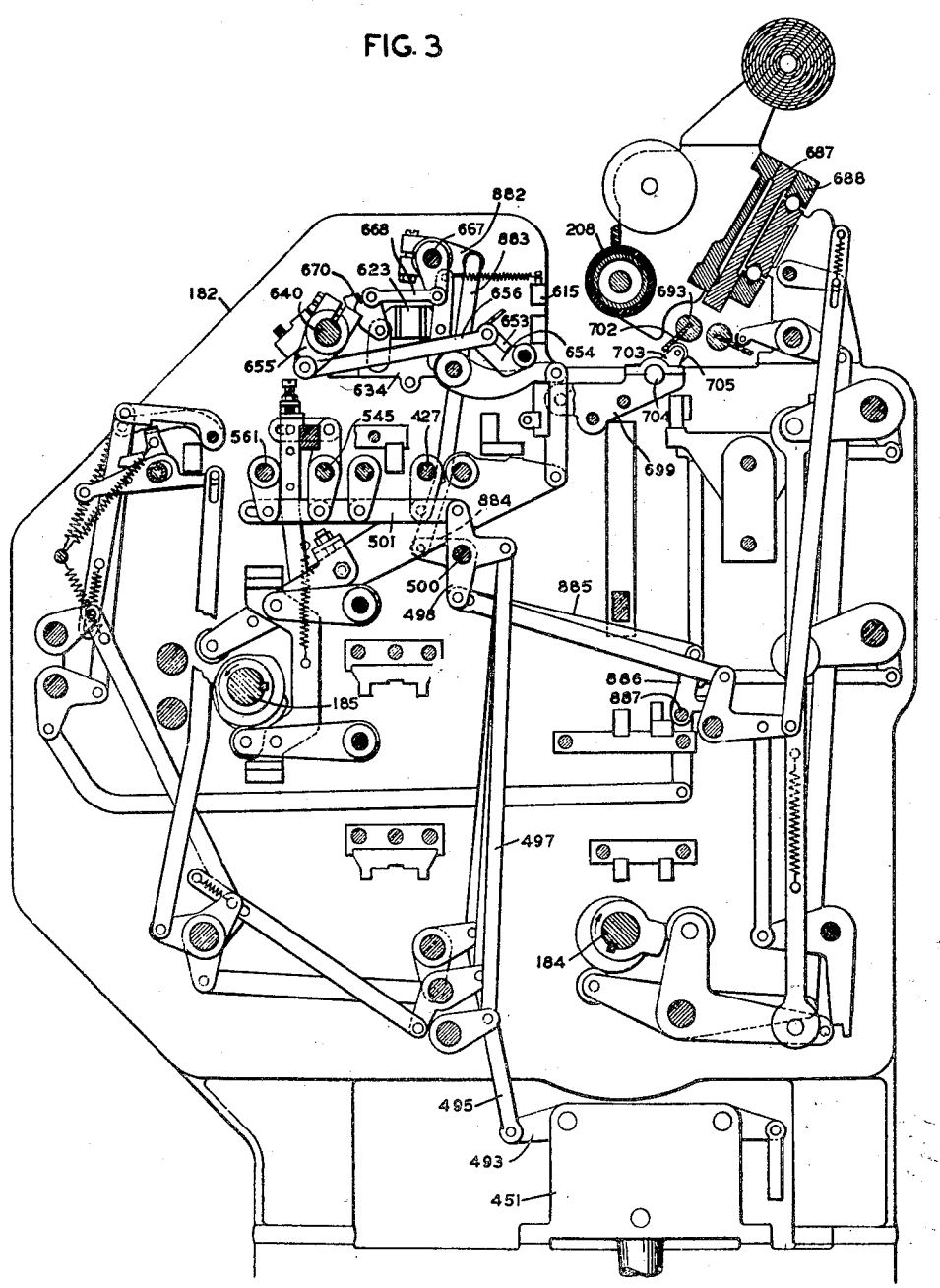
Fig. 3 is a view in vertical section just inside the right-hand frame plate.

The hammer firing mechanism is supported by a third cross frame bar 623, also detachably secured at its ends to the frame members 180 and 182. Secured to the rear face of the bar 623 is a series of comb pivot blocks 624 similar to the blocks 621, having pivot rods 625 for a succession of hammer latches 626. A common spring 627 acts to throw the type hammer against the firing pin 617 and also to retain the latch 626 in latching position. To each of said latches there is pivoted a release link 628 lying horizontally and urged to turn clockwise about its pivot by a spring 630. Forward of its pivot each releasing link has a shoulder 631 adapted to be moved by the spring 630 into the path of movement of a flange 632 projecting downward from a transverse releasing bar 633, which at a suitable time is reciprocated rearward and back so as to actuate any of the links 628 that may be in engagement with the flange 632. This bar 633 (as shown in Figs. 3 and 4) is secured at each end to a plate or bar 634 (Figs. 3 and 4) extending front and back of the machine and supported by two vertical parallel links 635 hung from two brackets 636, one projecting forward and the other rearward from the frame bar 623. One of the links 635 is prolonged upward and connected with a restoring spring 637 to hold the bar normally in its forward position. These plates 634 support a rod 659 to limit the downward movements of the links 628.

In order to operate the hammer mechanism, a rock shaft 640 journalled at its ends in the main frame pieces 180 and 182, is rocked by cams on the drive shaft 185 as shown in Figs. 2 and 9. A follower lever 641 pivoted at 642 to the outside face of the frame member 180, has a cutout to embrace the projecting end of the shaft 185 and it carries two follower rollers, namely, a roller 643 engaging the underside of a cam 644, to depress the lever 641 and a second follower roller 645, engaging another cam 646 to restore said lever. This lever 641 is connected by a link 647 with an arm 648 fast on the end of the shaft 640. The construction is such that said shaft 640 is rocked counter-clockwise and back in the mid-part of each cycle of the machine.

Each of the bars 634 which carry the releasing bar, 633, has its forward end made into a sort of anvil 650 (see Figs. 4 and 9), which is struck by the end of a screw 651 adjustably mounted in an arm 652 fast on the rock shaft 640. By this means the releasing bar 633 is given a short movement toward the rear of the machine at the proper time, and it is immediately returned by its springs 637.

The type hammers 620 are restored after firing by a bail bar 653 mounted at its ends on arms 654 pivoted to the frame members 180 and 182 (Figs. 3 and 4). At each end of the machine, as best shown in Fig. 3, the rock shaft 640 has fast thereon an arm 655 connected by a link 656 with the bail arm 654 so that the bail 653 is normally held nearly in its forward position with the type hammer retracted, but, when the shaft 640 is rocked, it swings clockwise out of the way and then back to restore any operated hammers.

The release links 628 are controlled in part from the type bars 195, as shown in Fig. 5. A frame bar 555 has a succession of pivot blocks 657 secured thereto and in which, at 658, are pivoted a succession of levers 660, each of which has its rear end normally held down by a shoulder consisting of the lower end of the upper section 196 of the type bar. This lever is free to rock counter-clockwise a limited distance whenever its associated type bar rises. The forward end of the lever is connected with a forked push link 661 whose upper end engages a pin on the rear arm of the associate release link 628 and holds the link with its shoulder 631 out of the path of the flange 632 so that, unless the type bar rises, this release link will not be operated by the releasing bar 633.

The latches 626 are equipped with settable connectors 663 for the printing of significant zeros. A simple form of these is shown in Figs. 1, 8, 5 and 6, and in another form capable of more varied use, in Figs. 13–17 and Figs. 10 and 11. In Fig. 8, the two connectors 663 at the left are set active and the one at the right has been turned about its pivot 662 to inactive position. This member is yieldingly held in either of said positions by a detent spring 664. When one of these connectors is in its active position an ear 665 thereon stands just behind an ear 666 formed off from the next latch to the right of it so that, if one latch is operated by the firing bar 633, its motion will be communicated to those at the right of it as far as these connectors are set in active position. This connection may be split at any point by turning one of them to inactive position where its ear 665 is out of engagement with the ear 666 of the next latch. As the topmost, or zero type stands normally at printing position, it can be printed only by the action of the connectors 663. For this reason, when numbers occur in the text to be printed, the letter "O" is punched in the card in place of a zero.

In order to prevent printing under certain conditions, such, for example, as in non-list tabulating, where it is desired to print only totals and not items, a non-print shaft 667 is journaled in the frame members 180, 182 above the hammer mechanism. This shaft may be rocked to two positions, namely, clockwise to a non-print position shown in Fig. 5, and counter-clockwise to a printing position shown in Fig. 6. As best shown in Figs. 5, 3, and 4, this shaft 667 has at each side of the machine a depending arm connected by a horizontal link 668 with an arm 670 of a bail bar 671 extending across the whole set of printing devices (see Fig. 9). The arms 670 are pivoted to the brackets 636 of the frame bar 623.

*Control levers*

Associated with the printing hammers or with their firing links 628, are certain control devices designed to permit the operation of certain of said links by the bar 633, under one condition and to prevent it under another condition; and said devices are settable to afford a variety of different modes of operation. For example, some of said devices may be so set as to prevent printing in an adding column except on total taking cycles, and at the same time other of said devices may be so set as to cause printing in a designation column only on the first cycle after a total; and they may be set in other ways. The illustrated machine is designed to be highly flexible in respect to modes of operation, and there are, therefore, provided individually settable control levers, one for each type hammer. These will ordinarily though not always be set in groups; but they are preferably made individually settable so that such groups may be located wherever desired by the operator of the machine.

In the illustrated machine, each individually settable device comprises a control lever 672 (Figs. 5 and 6) pivoted at 673 in a slotted pivot block secured to the front face of the stationary bar 623. Each of the levers 672 has at its lower end a pin 674 adapted to overlie the front end of the associated release link 628 so as to hold it out of engagement with flange 632 on the releasing bar 633 even though the corresponding type bar may rise and free the link from the control lever 660; but the levers 672 can be swung clockwise to the position shown in Fig. 6, where they do not affect the release links. Each of said levers has a two-armed hook 675 pivoted to its upper end and retained in either of two hand-set positions by a detent spring 676. In Figs. 5 and 6, these hooks occupy their forward position where they engage in a groove in the bar 671. All of the levers 672, that are thus connected with that bar, will prevent the action of the releasing links 628 and their associated printing hammers when said bar is in the position shown in Fig. 5, but, if the print shaft be rocked counter-clockwise (Fig. 6), bar 671 will be moved toward the rear of the machine, all of these levers will have their pins 674 moved away from the links 628 and printing will occur as hereinbefore described.

In order to make the printing or non-printing by any desired type bar independent of the non-print shaft 667 and bail 671, the hooks 675 have each a rear arm having two notches 669, either of which may be hooked over a sheet metal flange 678 secured to the top of the stationary bar 623, as shown in Fig. 10. When the forward one of these notches is thus engaged, the control lever 672 has its stud 674 set out of the way of the releasing link 628 leaving said link active, and when the other notch is so engaged said stud is set in the path of said link and renders the latter inactive, so that the hammer cannot be tripped by its own releasing link, regardless of the setting of the non-print shaft 667 and bail 671.

In order to secure the mode of operation known as non-list, that is to say, to prevent the printing of items during tabulating cycles, and to bring about printing of amounts only on total and grand total taking cycles, the shaft 667 is connected operatively with the total and grand total shaft 426 and 427, respectively, by two links 680 and 681 (Fig. 2), each pivoted at its upper end to an arm on the shaft 667 and said links at their lower ends connected respectively to arms on the total and grand total shafts 426 and 427 by pin and slot. Thus, either of the shafts when operated may rock the non-print shaft counter-clockwise, that is to say, from its non-print to its print position.

*Total taking*

In the illustrated machine, the mechanism for taking totals is of the sort fully described in the parent application and much of it is, or may be identical with that described in Patent 2,323,816. It comprises a control unit 451, Figs. 1 and 3, containing total and grand total cam shafts driven, on occasion, by gearing comprising a worm wheel 461 engaging the base worm shaft 104. One or the other of these shafts may be set into operation under the control of the change of designation device 421. The cams on said cam shaft operate certain levers, such as 493, in timed relation, and said levers operate linkages to control the required functions of the machine. A total taking operation comprises a blank cycle and a total cycle of the machine, and a grand total comprises the same followed by a grand total cycle. Preparatory to a total cycle, a lever 493 (Fig. 3) pulls a linkage 495, 497, 498, 501, the last of which acts on an arm of the total shaft 426 to "pull" the latter, or in other words, to rock said shaft counter-clockwise. Preparatory to a grand total cycle, a similar linkage "pulls" the grand total shaft 427. A "slam bail" shaft 545 and a "designation" shaft 561 are also "pulled" at suitable times. Each of these four shafts (Fig. 5) carries a flange 563 adapted to be engaged by pawls 565, 566, or 567 mounted on control bars 552, one for each type bar 195. The bar 552 is connected by a spring 551 with a "slam bail," or holding pawl 546 adapted to engage the rack teeth 198 on its type bar 195, to prevent upward motion of said bar. In Fig. 5 the pawl or coupler 567 is shown set inactive, 566 is set active, and 567 is active, that is to say, it is set to be engaged by the flange 563 of the shaft 561. Said shaft is in "pulled" position and has drawn bar 552 frontward and drawn pawl 546 into engagement with the bar 195 to prevent operation of the latter. When shaft 561 rocks clockwise, a spring 557 will draw bar 552 rearward, releasing the pawl.

The non-print shaft 667 is normally held in non-print position by a suitable spring but it can, however, be hand-set and fixed in printing position as follows: At the left-hand side of the machine (Figs. 4, 9, and 12) an arm 682 projects forward from the shaft 667 and it has on its forward end a plunger 683 which can be set by hand in a withdrawn or in a projected position. When it is desired to print items, the shaft 667 may be rocked counter-clockwise by hand and the plunger projected to engage beneath a fixed lug 684 to hold it in that position (Figs. 9 and 6). This retains in ineffective position all levers 672 that are coupled to bar 671, permitting the type hammers to be fired in all positions and in all cycles in which the type bars rise.

*Changing zero set-up*

In most set-ups of the machine, some zone or several zones of the printing mechanism are used for numbers, and in these zones the zero-print connectors 663 are set active. But it is sometimes desirable to print one or more lines of text, or partial lines of text, such, for example, as the name and address of the customer, on the same paper as the ordinary data, and in that event it is needful to suppress temporarily the printing of zeros, or of some of them, and to restore such printing after the text has been printed. Means are provided for doing this automatically. In the present instance, and preferably it is done under card control. A special hole in a card causes the zero-print connectors, or any selected ones of such connectors, to be disabled during the cycle controlled by that card, the connectors being restored to their original setting when other cards are analyzed. This mechanism is settable by hand so as to afford a variety of modes of operation and of results.

The mechanism is shown in Figs. 10, 11, and 13–17, inclusive. As there shown, the hammer latches 626! are mounted and act the same as in Fig. 5 and are actuated by the release links 628, which, in turn, are influenced by the control levers 660 and 672, all as before. Each hammer latch has a sector shaped connector or coupler 870 pivoted to its right-hand face and a stud 871 projecting from its left-hand face. When a latch is released, its connector if in active position as shown in Figs. 15 or 16, will act on the stud 871 of the next latch to its right to release that also. Means are provided whereby any connector may be rocked about its pivot so as, at the moment of printing, to occupy any one of four positions, A, B, C, and D, illustrated respectively in Figs. 16, 15, 14, and 13, the first two being active positions in register with the stud 871 and the other two inactive positions above said stud. To this end, the connector 870 has pivoted thereto a forked control link 872, the rear branch of which terminates in a finger piece 873 by manipulation of which the coupler may be given at will a hand setting. The forward branch of said forked link has four studs 874 (extrusions in the present case). These forward branches all cooperate with a universal connector-shifting member 875 here shown as a long sleeve (Figs. 10 and 11) surrounding the non-print shaft 667 on which it is loosely journaled at its ends by two collars 876, and having fixed into and projecting rearward therefrom a sheet metal flange 877 having a series of slot-like holes 878, into each of which is inserted the forward branch of one of the links 872. Each hole 878 at its forward part is wide enough to allow said branch and its studs 874 to be moved up and down through the hole, but the rear end of the hole is narrowed so that if the link is moved back into it, the body of the link will be loose in the hole, but the studs will project over and under the metal. In this position with one stud above and the other below the flange, the link is in effect pivoted to the flange. The construction is such that, by manipulation of the finger piece 873, the link may be swung forward and adjusted up and down and then swung rearward into the narrow part of the hole, where the metal of the flange 877 will lie between two adjacent studs. The couplers may thus be set individually and variably as desired each to any one of three positions, A, B, or C, and some in one position and some in another. At certain times in the operation of the machine, the sleeve 875 is rocked counter-clockwise with the effect that all of the couplers will be raised one space, each from whichever one of the three positions it had been set to initially; and, when the member 875 is restored, the connectors will be restored to their former set positions.

Preferably a scale plate 894 is attached to the member 875 to identify the letter space positions to which each link 872 pertains.

In order to provide for making the initial setting of the links 872 and maintaining them in set relation to the flange 877, each link 872 has a retaining member 880 pivoted thereto and standing behind the flange 877. A spring 881 urges this member counter-clockwise (Fig. 10) and presses its upper end against the rear edge of the forward branch of the link. The member 880 is so disposed as to prevent the link 872 from swinging forward out of the narrow part of the hole, but the pressure of the spring 881 does not come on the flange 877, leaving the pivotal connection between the link and the flange a loose and perfectly free one. When in setting the parts the operator draws the link forcibly forward into the wide part of the hole, the member 880 presses against the edge of the flange and the spring is stretched. When the operator releases the link, the spring draws it rearward into the narrow part of the slot until the upper end of the member 880 is contacted by the link.

The sleeve 875 may be rocked by hand or by any suitable automatic means, according to the needs of the work. In the present instance, and preferably, it is rocked automatically under control of a special hole in a card. The sleeve 875 has an arm 882 (Figs. 3 and 10) secured to its right-hand end and connected by a link 883 to a bell-crank 884 pivoted on the stud 500. Said bell-crank is connected by a link 885 with a bell-crank 886 pivoted on a stud 887 mounted on the right-hand main frame member 180. Said bell-crank 886 has formed from its horizontal arm an ear 888 lying above a pin 890 slidable in brackets 891 attached to the upper right-hand surface of the translator frame 238, said pin operated by a Bowden wire 892. In the present instance a second Bowden wire actuated pin 893 is mounted in the same brackets in position to actuate a second bell-crank 894 controlling certain other mechanism. The construction is such that wherever a piece of work requires the use of the automatic split print mechanism, the translator used for that job will be provided with a wire 892 arranged to be controlled by any predetermined index position of the card. When then a card having such a hole is sensed, the bell-crank 886 will be rocked, rocking the sleeve 875 as described. Each connector 870 which had been set to active position A, will be shifted to position B and still be active; each connector set to active position B will be shifted to inactive position C; and each connector set to inactive position C will be shifted to D and be still inactive for that particular cycle. When a card without the special hole is sensed, the sleeve 875 will rock back to normal position and the connectors will resume the several conditions to which they had been set by hand. In one application of the invention, there would be inserted between two groups of item cards first a total card, then one or more alphabet cards each having the special hole, and then the item cards of the new group punched to print numbers in one or more fields.

If desired, the connectors 870 may be made settable by hand to the position shown in Fig. 29, where said connectors are normally below the stud 871 and are, therefore, adapted for alphabet printing. A card containing the special hole would cause the connectors to be raised to active position for printing a number. Other variations may also be made.

In the machine described in the parent application, the two type bars 195 next to the right of the lowest order wheel of each accumulator 97 (Fig. 1) are used to print characters to characterize the operations performed by the accumulators; and the first of said bars has a similar use in Patent No. 2,323,816. Each accumulator has certain stop fingers 407 projecting rearward therefrom in such positions that, when the accumulator is moved into mesh with the racks preliminary to printing the total, certain of these stops are in positions to arrest one or another of the lugs 406 projecting from the faces of the two characterizing type bars. Thus different totals are characterized by the letters T (total), CT (credit total), G (grand total) and CG (credit grand total). But these machines frequently perform a total or grand total taking operation when the totalizers are clear; with the result that nothing is printed in the numerical column, but the characters at the right of that column are printed to designate the sort of operation performed. There are certain classes of work where it is desirable to eliminate this printing of characters unless a total is printed, and, among the various possible hand settings of the mechanism, one to that effect may be described. To this end the hooks 675 for the character type bars are set with their rear notches 669 hooked to the flange 678, thus locking the control levers 672 in position to make the release links 628 inactive. The rising of those character type bars will then not cause the type hammers to be tripped. However, the zero printing connectors 663 or 870 are set active so that the releasing movement of the latch 626 of the units column will be transmitted to the latches in the character columns, and the characters will, therefore, be printed if any total is printed, and not otherwise. It should be remarked, however, that this setting would result in the characterizing type hammers being tripped when printing items, at which time, if the item is positive, the characterizing type bars of the illustrated machine stand at zero. If it is desired ever to use this setting, the topmost, or zero types, should be substituted by blank types in these two type bars. This would do no harm, for in printing text the card is always punched for the letter O, to represent zero.

*Paper carriage*

The paper carriage is, with an exception that will be mentioned, substantially identical with that of the Lasker and Mueller patent. Each of the main frame members 180 and 182 supports a bracket 685 (Figs. 2, 4, and 12) which brackets, in turn, support a bearing rail 686. The carriage comprises a transverse frame bar 687 and, secured thereto, bearing rails 688 so that the carriage can be moved to different positions laterally.

The platen 208 is supported in an auxiliary frame which (Fig. 4) comprises a longitudinal bar 690 and right and left end frames 691 in which the platen shaft is journaled. The auxiliary frame normally occupies a rear position shown in the drawings, but, at each printing operation, it is momentarily moved slightly toward the front of the machine to bring it within the range of the types. As best shown in Fig. 2, the main carriage bar 687 has secured thereto at each end a bracket 692 in which is journaled a cross shaft 693 (Fig. 12) which supports at each end an arm or plate 694, which is pivoted at 695 to the end plate 691 of the auxiliary frame. A lever 696 is pivoted to the end of the frame bar 687 and in its forked upper end lies a square block 697 pivoted on a pin 698 projecting from the member 691. A link 700 connects arms of these two plates or levers 694 and 696 so as to cause them to rock in unison. The construction is such that a counter-clockwise turning of the shaft 693 will result in the auxiliary carriage having a parallel motion toward the front of the machine. The construction just described is duplicated at the left-hand end of the machine. All of this is identical with the Lasker and Mueller patent, but in that patent the carriage is normally drawn rearward by springs, and, at the proper time for printing, it is positively moved forward by the power mechanism. This mode of operation is reversed in the present machine, the carriage being driven forward by two springs 701, acting on the levers 696, to rock said levers counter-clockwise. This change results not only in a better operation, but in a more flexible control of the carriage, as will appear hereinafter. The shaft 693 has set into it a longitudinal flange 702 (Figs. 3, 4, and 12), substantially the same as in the Lasker and Mueller patent. The shaft is rocked clockwise by two lever arms 703, one on each side of the machine, said arms fast on a rock shaft 704 suitably journaled in brackets 699 and each arm carrying a roller 705 pressing against the rear or under side of the flange 702, so that by rocking the levers 703 counter-clockwise, the shaft 693 will be rocked clockwise, and the carriage returned to its normal retracted position. The Lasker and Mueller patent shows a similar construction, but the roller engages the front surface of the flange 702. One or the other of the rollers 705 will coact with this flange in any position of the carriage. The left-hand lever 703 (Fig. 4) has a forwardly extending arm to which is pivoted a long pull link 709, the lower end of which is pivoted to a follower lever 706. The roller 707 of this lever engages a cam 708 on the rear drive shaft 184. This cam holds the auxiliary carriage in its retracted position except that it permits a momentary forward movement thereof at the time of printing which is near mid-cycle.

In order to hold the carriage against the vibration on non-printing cycles of the machine, a latch 710 is arranged to hook over an ear 711 of the left-hand arm 703, as shown in Figs. 12 and 7 to hold said arm down and the carriage retracted as long as said hook is effective. Said hook is moved to latching position by a spring 712 and various means may be provided for releasing it in order to permit printing. As one means to this end the hook 710 is made in the form of a bell-crank to which is pivoted a link 713 (Fig. 12) connected by pin and slot 714 with an arm 715 extending rearwardly from the non-print shaft 667. Whenever this shaft is swung counter-clockwise to permit the operation of such type hammers as are under its control, the link 713 will release the latch 710. Means may be provided to release it whenever any printing is desired and one other means will be described hereinafter. It includes a link 754 (Figs. 4 and 18) operated by an arm 775 on the designation shaft 561. The mode of operation of the designation shaft 561 is fully described in the parent application, Serial No. 316,739. For the present purposes it will suffice to say that said shaft has on occasion, a rocking motion clockwise to a print position and counter-clockwise to a non-print position and that it may by a manual setting of the connector 567 (Fig. 5) be caused to control selected type bars used for designation and alphabet printing in such wise that when said shaft is set at non-print, the type bars controlled by it will be held against rising to printing positions, and when said shaft is rocked to print position such type bars are allowed to rise. When so rocked, it operates the link 754 to release the latch 710 and permit the carriage to advance as described. The whole construction is such that in a machine cycle on which no printing is done the carriage does not execute the then useless vibration forward and back; but any device in the machine that causes printing to occur, may be connected to release the latch 710. It is sometimes desirable to lock the hook 710 out of action altogether. This may be done by any suitable hand-operated latch, such as the latch 759 pivoted on the stationary frame and adapted to be dropped down behind a pin 7591 on the link 754 to hold the latter in its rear position (Fig. 19).

It is believed that the mode of operation of the mechanism will be apparent from the above description.

The mechanism may be modified to adapt it to machines other than the one illustrated, and also in various other respects without departing from the invention.

What I claim as new, and desire to secure by Letters Patent, is:

1. The combination with spring impelled type hammers, latches restraining said hammers, release links to release said latches, a universal print bar to operate said release links, and a universal non-print bar, of control members for said release links settable to permit or to prevent engagement of their associate release links with said print bar, said control members being severally settable at will in two fixed positions in one of which a control member so set prevents engagement of its associate link with said print bar and in the other of which it permits such engagement, and said control members being also severally connectable at will with said non-print bar, and the members so connected being moved en bloc into one and the other of their said two positions when said non-print bar is moved to its print and to its non-print positions.

2. In an accounting machine having means for printing a line, the combination of a number of zero printing couplers settable at will to active and to inactive positions some to active and others to inactive position, and a universal member connected with said couplers and operable to shift the couplers so set into other settings.

3. In an accounting machine having means for printing a line, a series of zero-printing couplers settable at will to provide for automatic zero printing in one part of the line and not in another, and a universal member acting when operated to shift temporarily all of said couplers together to change the hand setting into another arrangement.

4. A series of zero printing couplers each settable at will to three initial positions in two of which the coupler is active and in the third of which it is inactive, and universal means for temporarily shifting all of said couplers in such wise that a coupler set at its first active position is shifted to another active position, a coupler set at the second active position is shifted to an inactive position, and a coupler set at an inactive position is shifted to another inactive position.

5. In the automatic zero printing mechanism of an accounting machine, a zero printing coupler settable by hand to either of two positions in both of which said coupler is active, and a shiftable member to which said coupler is connected, said member when shifted moving said coupler to its second active position if said coupler was hand set to its first position, and to an inactive position if said coupler was hand set to its second active position.

6. In the automatic zero printing mechanism of a printing accounting machine, the combination of a number of zero couplers, a universal member for shifting said couplers said member having two positions, and hand settable means for connecting said couplers to said member in a plurality of relations in one of which a said coupler is inactive in both positions of said member, in another of which a said coupler is active in the first position of said member and inactive in the second position and in another of which a said coupler is active in both positions of said member.

7. In a card controlled tabulating machine, the combination with card controlled printing means operated through a succession of cycles and including types and a paper platen, of spring means for advancing said platen toward said types, power-operated means for withdrawing said platen after each printing operation, a latch for retaining said platen in withdrawn position, means acting automatically to release said latch on certain machine cycles and not on other cycles, and hand operated means for disabling said latch so as to allow said platen to advance on all cycles.

JOHN MUELLER.

REFERENCES CITED

The following references are of record in the file of this patent:

UNITED STATES PATENTS

| Number | Name | Date |
|---|---|---|
| 1,501,004 | Lake | July 8, 1924 |
| 1,636,924 | Oberhauser | Oct. 9, 1928 |
| 1,946,900 | Daly | Feb. 13, 1934 |
| 1,994,524 | Lake | Mar. 19, 1935 |
| 2,131,918 | Mills | Oct. 4, 1938 |
| 2,150,218 | Gray | Mar. 14, 1939 |
| 2,323,816 | Lasker | July 6, 1943 |